Oct. 28, 1969　　D. M. ROBERTSON　　3,474,812
FLUID FLOW REGULATORS

Filed Dec. 13, 1965　　2 Sheets-Sheet 1

INVENTOR
David Millar Robertson
BY Townshend & Maurole
ATTORNEYS

Oct. 28, 1969          D. M. ROBERTSON           3,474,812
                    FLUID FLOW REGULATORS
Filed Dec. 13, 1965                          2 Sheets-Sheet 2

INVENTOR
David Millar Robertson
BY Townshend & Meserole
ATTORNEY

United States Patent Office 3,474,812
Patented Oct. 28, 1969

3,474,812
FLUID FLOW REGULATORS
David M. Robertson, Harlow, England, assignor to The British Oxygen Company Limited, a British company
Filed Dec. 13, 1965, Ser. No. 513,497
Claims priority, application Great Britain, May 13, 1965, 20,257/65
Int. Cl. A62b 7/00, 9/02
U.S. Cl. 137—81     6 Claims

ABSTRACT OF THE DISCLOSURE

Oxygen is supplied to a user through a regulator under control of a demand valve that opens and closes in response to pressure variations incident to use. In operation, the valve sequentially uncovers or covers a plurality of orifices of different sizes through which demand oxygen flows as jets that create a venturi action to suck ambient air into the jet streams for selective dilution of oxygen flowing through the regulator. Aneroid means regulate admission of both the oxygen and the air.

---

This invention relates to valves for controlling the flow of fluid from a source of fluid under pressure, such valves being particularly suitable for use in regulators for supplying a breathable gas to a user, for example in oxygen regulators for use in aircraft.

It is an object of the invention to provide an improved value for controlling the flow of fluid from a source under pressure.

It is a further object of the invention to provide an improved regulator for supplying a breathable gas to a user.

It is a further object of the invention to provide an improved regulator for supplying a breathable gas to a user, including means for exerting an entrainment action to dilute the breathable gas with atmospheric air and for rendering the degree of entrainment largely independent of variation of rate of flow of breathable gas.

It is a still further object of the invention to provide an improved regulator for supplying a breathable gas to a user, including optionally operable means for exerting an entrainment action to dilute the breathable gas with a proportion of atmospheric air, the degree of entrainment varying with ambient atmospheric pressure and being zero at and above a predetermined ambient atmospheric pressure.

Figure 1:
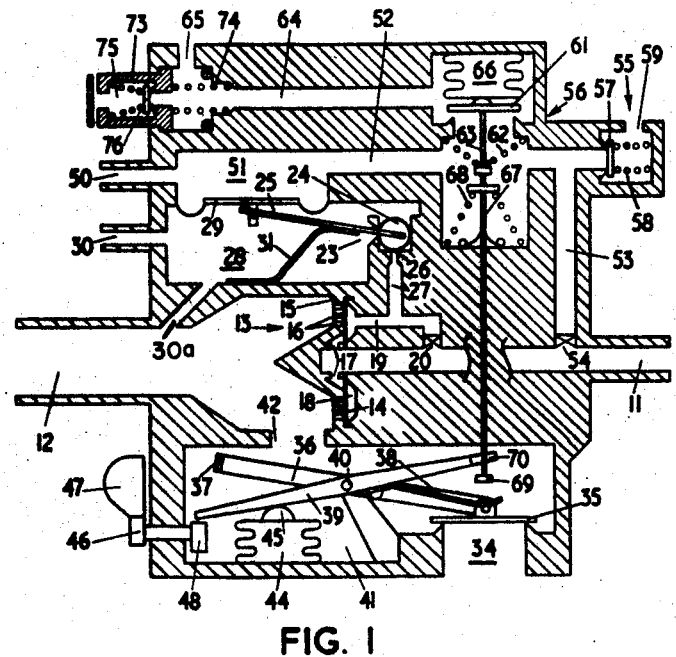
Figure 4:
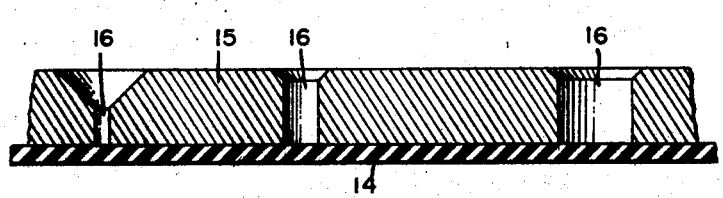
Figure 2:
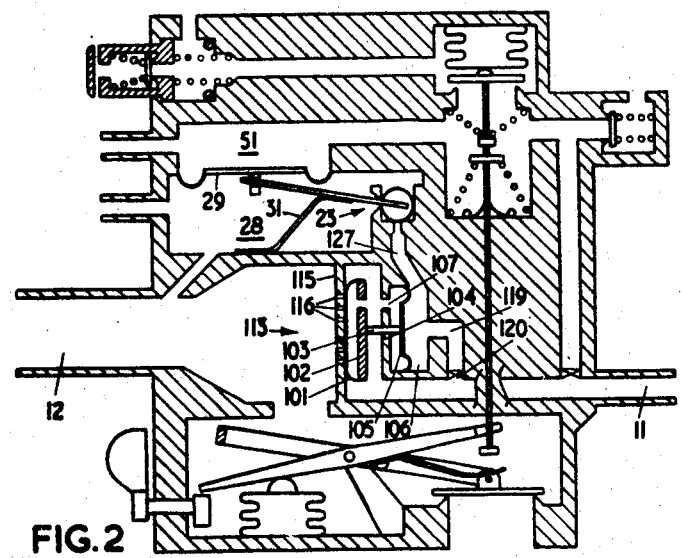
Figure 3:
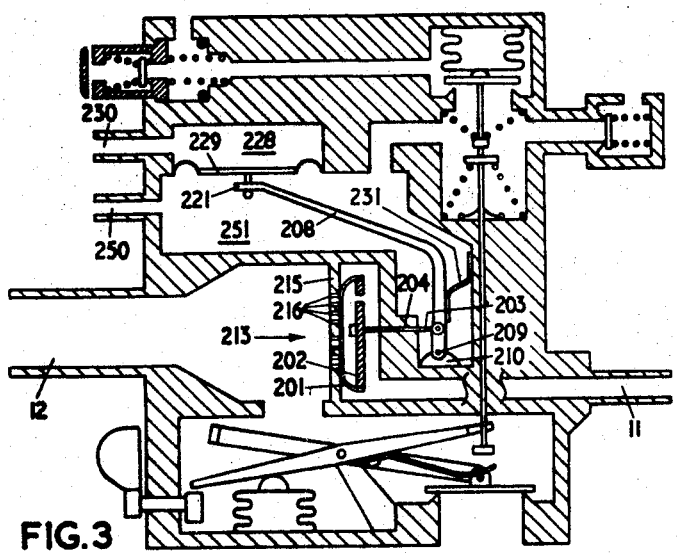

Other objects and advantages will become apparent from the following description taken in connection with the accompanying drawings, in which each of FIGURES 1, 2 and 3 is a diagrammatic sectional view of a different aircraft breathing regulator embodying a valve constructed in accordance with the invention. FIGURE 4 is an enlarged fragmentary section through the main valve 13 of FIG. 1, illustrating the difference in sizes of the holes indicated generally as 16 in FIG. 1.

The breathing regulator shown in FIGURE 1 is contained in a casing and has an oxygen inlet passage 11 arranged for connection to a source (not shown) of oxygen under pressure, and an oxygen supply or outlet passage 12 arranged for connection to an oxygen supply line and an aviator's oxygen mask (not shown).

In between the inlet passage 11 and the supply passage 12 is a main valve, generally indicated by the reference numeral 13, comprising a valve member in the form of a flexible annular diaphragm 14, anchored at its inner and outer edges, and an annular valve seat 15 having a plurality of holes 16 therethrough, opening to the supply passage 12.

On the same side of the annular diaphragm 14 as the plurality of holes 16 is an annular passage 17 leading from the inlet passage 11. An annular chamber 18 is situated on the other side of the annular diaphragm 14, extending over the un-anchored area of the diaphragm 14 and communicating, via a passage 19 and a flow restrictor 20, with the inlet passage 11.

A pilot valve, generally indicated by the reference numeral 23, comprises a ball valve member 24 carrying an operating arm 25 and seating upon a pilot valve seat 26 lying between a passage 27, which joins the passage 19, and a sensing chamber 28. A partly flexible sensing diaphragm 29 forms part of one wall of the sensing chamber 28, and the underside of the sensing diaphragm 29 engages the free end of the operating arm 25. The arm 25 carries one end of a biasing spring 31, the other end of the spring being mounted on a wall of the chamber 28. A port 30 and a sensing line (not shown) place the sensing chamber 28 in communication with the aviator's oxygen mask (not shown).

The parts of the breathing regulator so far described all co-operate in the supply of oxygen to the aviator on demand, and this part of the functioning of the regulator will now be described.

FIGURE 1 shows the main valve 13 in the closed position, when no demand for oxygen exists, with the annular diaphragm 14 closing the plurality of holes 16 and the annular passage 17. The diaphragm 14 is held in this position by differential pressure, the inlet oxygen pressure in the annular chamber 18 (via the restrictor 20 and the passage 19) acting over a larger area of the diaphragm 14 than the inlet oxygen pressure which acts upon the other side of the diaphragm 14 via the inlet passage 11 and annular passage 17.

When the aviator inhales, he produces a reduction of pressure in his mask, and this reduction is transmitted via the sensing line (not shown) and port 30 to the sensing chamber 28. The reduction of pressure in the chamber 28 causes the sensing diaphragm 29 to move inwards, tilting the operating arm 25 and unseating the ball valve member 24 to open the pilot valve 23. The pressure in the annular chamber 18 and the passages 19 and 27 thus falls, and the annular diaphragm 14 is unseated by the inlet oxygen pressure in the passage 17. The diaphragm 14 unseats progressively, i.e. it uncovers first the holes 16 nearest to the passage 17, then with increasing oxygen flow due to increased demand it uncovers the next holes, and so on. Oxygen thus passes from the inlet passage 11, through the annular passage 17 and some or all of the holes 16 to the outlet passage 12, and then to the oxygen supply line and the aviator's mask.

When the aviator stops inhaling and begins to exhale, the pressure in the sensing line and sensing chamber 28 rises, causing the diaphragm 29 to move out to its former position and moving the operating arm 25 to reseat the ball valve member 24 and close the pilot valve 23. Oxygen flowing through the restrictor 20 is then once more entering a closed space, so that the pressure in the passages 19 and 27 and the annular chamber 18 rises, returning the annular diaphragm 14 to the valve seat 15 and shutting off the flow of oxygen to the outlet passage 12.

This cycle of events is repeated each time the aviator inhales and exhales.

Instead of a port 30 and separate sensing line from the sensing chamber 28 to the face mask, it is possible to provide a sensing port 30a leading from the sensing chamber 28 to the oxygen supply passage 12. The reduction and increase in pressure consequent upon the aviator's inhalation and exhalation are then transmitted to the sensing chamber 28 by the oxygen supply line (not shown). If desired, both sensing systems can be used together.

The breathing regulator has a number of features designed to facilitate the aviator's breathing at various altitudes, and these will now be described with further reference to FIGURE 1.

In normal operation up to an altitude of about 30,000 feet, it is desirable to dilute the oxygen with ambient air, both for economy and to prevent harmful physiological effects, and for this purpose the regulator has an air inlet port 34 closable by an air inlet valve member 35 mounted at one end of a first lever 36. The other end of the first leaver 36 has a lug 37. A leaf spring 38 is mounted on one arm of a second lever 39 near to its common fulcrum 40 with the first lever 36; the free end of the leaf spring 38 bears upon the valve member 35 and biasses it to the closed position. The air inlet port 34 opens into an air inlet chamber 41 in which the two levers 36 and 38 are mounted; the air inlet chamber 41 is in communication with the oxygen supply passage 12 via a port 42 which is situated close to the plurality of holes 16 in the valve seat 15.

An aneroid capsule 44 is mounted on the floor of the air inlet chamber 41, the movable end 45 of the capsule 44 contacting the arm of the lever 39 which does not carry the leaf spring 38. A toggle switch 46 is arranged in the wall of the air inlet chamber 41 so that by moving the switch handle 47, which is outside the chamber 41, an operating lug 48 inside the chamber is made to contact the above-mentioned arm of the lever 39 adjacent to the movable end 45 of the aneroid capsule 44. This position will be termed the "ON" position of the toggle switch 46.

The operation of the air-dilution feature of the regulator is as follows. When the main valve 13 has opened in response to a demand from the aviator, oxygen passes through some at least of the plurality of holes 16 to the oxygen supply passage 12. The holes 16 are small, so that the jets of oxygen passing through them reach a high velocity and cause a pressure drop at the port 42 and in the air inlet chamber 41. The air inlet valve member 35 is thus sucked open, moving with the lever 36 against the action of the leaf spring 38 and admitting ambient air through the air inlet port 34. The admitted air is entrained with the oxygen in the oxygen supply passage 12, and is inhaled by the aviator. A heavy demand by the aviator results in more of the holes 16 being uncovered by the flexible diaphragm 14, allowing the passage of more oxygen as previously explained. This causes a greater pressure drop at the port 42 and entrains a correspondingly larger quantity of air. The degree of entrainment is largely independent of variation of rate of flow of oxygen through the main valve.

When the aviator exhales, the main valve 13 closes and the flow of oxygen ceases. When no pressure drop exists at the port 42, the leaf spring 38 closes the air inlet valve member 35 against the air inlet port 34.

The aneroid capsule 44 expands with increasing altitude, and as it does this its movable end 45 tilts the lever 39 clockwise about the fulcrum 40 so that the lever 36 cannot move so far in an anti-clockwise direction (as when the air inlet valve member 35 is raised to open the air inlet port 34) because the lug 37 on the lever 36 comes into contact with the lever 39. With increasing altitude the movement of the lever 36 is thus gradually limited so that the air inlet valve member 35 cannot rise so far and will not admit so much air, and the aviator thus breathes oxygen diluted with less air at higher altitudes.

Preferably the aneroid capsule 44 is arranged so that at about 30,000 feet it has expanded sufficiently to tilt the lever 39 into engagement with the lug 37 when the air inlet valve member 35 is closing the port 34. At and above 30,000 feet, there is thus no dilution of the oxygen with air.

The lever 39 can also be tilted to engage the lug 37 by moving the toggle switch 46 to its "ON" position. This will hold the air inlet valve member 35 closed at any altitude, enabling the aviator to breathe pure oxygen if necessary, for example if his environment contains smoke or fumes, or enabling the supply of pure oxygen by the breathing regulator to be tested.

When an aviator flies at or above an altitude of about 40,000 feet, he cannot maintain in his lungs the minimum oxygen pressure necessary for life by breathing even pure oxygen at the ambient pressure. It is thus necesssary for him to be supplied with oxygen at a pressure greater than ambient pressure, and the breathing regulator which is being described makes this "pressure breathing" possible. The regulator also establishes a "safety pressure" in order to prevent inward leakage of ambient air, for example around the edges of the face mask, at altitudes of about 15,000 feet and over.

With further reference to FIGURE 1, it will be seen that the sensing diaphragm 29, which form part of one wall of the sensing chamber 28, has a pressure chamber 51 on its other side. The pressure chamber 51 is shown with a reference pressure port 50 in its side. The purpose of this port 50 will be described after, but its presence is optional and until further reference is made to it, its showing in FIGURE 1 should be ignored. The pressure chamber 51 communicates wih the oxygen inlet passage 11 via two passages 52 and 53 and a second restrictor 54, and can als obe placed in communication with the atmosphere through two valves, generally indicated by the reference numerals 55 and 56, which are situated in the passage 52.

The valve 55 is situated at the end of the passage 52 remote from the pressure chamber 51, and comprises a valve member 57 which opens outwards against the action of a spring 58, placing the pressure chamber 51 and its associated passages 52 and 53 in communication with the atmosphere through a port 59.

The valve 56 is situated in one wall of the passage 52, and comprises a valve member 61 which opens outwards against the action of a spring 62 which bears upon a valve stem 63, placing the pressure chamber 51 and its associated passages 52 and 53 in comunication with the atmosphere through a passage 64 and port 65. The outward movement of the valve member 61 is limited by an aneroid capsule 66.

As shown in FIGURE 1, the valve member 61 of the valve 56 is being held in the open position, against the action of the spring 62 tending to close it, by a long pin 67 one end of which is urged into contact with the valve stem 63 by a spring 68. The other end of the pin 67 carries a crosspiece 69 and extends into the air inlet chamber 41, where it can be engaged by the suitably-shaped end 70 of the lever 39 when this lever is tilted in a clockwise direction.

The port 65 at the end of the passage 64 can be closed by digital pressure on a piston 73 sliding longitudinally in an enlarged portion of the passage 64, the pressure overcoming the resistance of a spring 74 which normally maintains the piston 73 in the position shown. The piston 73 has a longitudinal bore 75 therethrough, the bore being normally closed, as shown, by a spring loaded valve member 76.

In describing the operation of the "safety pressure" and "pressure breathing" systems, it will first be assumed that, as shown in FIGURE 1, the toggle switch 46 is in the "OFF" position and the regulator is operating at an altitude below 15,000 feet. The supply of oxygen on demand, and its dilution with air, will operate as previously described, and there will be ambient pressure in the pressure chamber 51, because although valve 55 is closed, the valve 56 is open and oxygen passing through the second restrictor 54 vents to atmosphere via passage 53, valve 56, passage 64 and port 65.

As well as its function of stopping the admission of air at about 30,000 feet, the aneroid capsule 44 also brings in "safety pressure" operation at an altitude of about 15,000 feet. The lever 39 which is tilted in a clockwise direction by the expanding aneroid capsule 44 is so arranged that at about 15,000 feet it has tilted far enough for its shaped end 70 to engage the cross-piece 69 at the end of the long pin 67, overcoming the resistance of the spring 68 to withdraw the pin 67 from its contact with the valve stem 63.

The valve 56 thus closes, and oxygen passing through the second restrictor 54 no longer vents to atmosphere but builds up pressure in the pressure chamber 51 and passages 52 and 53. The spring 62 which closes the valve member 61 of the valve 56 is chosen so that the valve 56 will open again if the pressure in the pressure chamber 51 and passages 52 and 53 exceeds 1″ of water, for example so that above 15,000 feet this pressure is maintained in the pressure chamber 51 and initially forces the sensing diaphragm 29 to move some way into the sensing chamber 28. This movement of the diaphragm 29 unseats the ball valve member 24 as previously described, and oxygen will pass into the sensing chamber 28 until the pressure on both sides of the sensing diaphragm is equal. Oxygen for breathing is thus supplied at a pressure of 1″ of water.

It is to be noted that if the toggle switch 46 is moved to its "ON" position, tilting the lever 39 as previously described so that the lug 37 on the lever 36 is engaged by the lever 39, then the lever 39 is tilted through and past the position in which its shaped end 70 engages the cross-piece 69. The toggle switch 46 thus brings in "safety pressure" operation as well as closing the air inlet valve member 35, regardless of the altitude.

"Pressure breathing" is brought into operation by the expansion of the aneroid capsule 66 with increasing altitude. At about 40,000 feet this capsule will have expanded sufficiently to engage the valve member 61 and hold it closed, so that with increasing altitude above 40,000 feet an increasing pressure in the pressure chamber 51 and passages 52 and 53 is required to lift the valve member 61. This increasing pressure is transmitted to the other side of the sensing diaphragm 29 in the manner explained for "safety pressure," and thus with increasing altitude the oxygen is supplied at an increasing positive gauge pressure.

The pressure in the pressure chamber 51 and passages 52 and 53 cannot increase indefinitely, but is limited by the valve 55, which is set to open and relieve the pressure if it exceeds a figure of, say 2–5 p.s.i.

The piston 73 acts as a test button. If the valve member 76 is set to open at, for example 0.5 p.s.i.g., then when the piston 73 is pushed inwards to close the port 65, the whole system is pressurised to this figure.

The nature of the aviator's face mask is not relevant to the present description except insofar as the exhaust valve is concerned. A simple exhaust valve, e.g. of the flap type, will have the disadvantage that when pressure rises in the mask, due to the inflow of oxygen under pressure, the valve will open and a large proportion of the oxygen will pass to exhaust and be wasted. It is therefore desirable to pressurise the back of the exhaust valve member, and for this purpose there may be used a reference pressure line (not shown) from the reference pressure port 50 in the pressure chamber 51. It has already been explained that the provision of the port 50 is optional; alternatively, the reference pressure line can connect the back of the exhaust valve member with the oxygen supply line 12.

The embodiment shown in FIGURE 2 is in many respects identical with that of FIGURE 1, the same reference numerals being used to indicate identical parts, but the main valve 13 of FIGURE 1 is replaced by a main valve generally indicated by the reference numeral 113.

The main valve 113 is arranged so as to be offset from the axis of the oxygen inlet passage 11. The valve 113 has a valve seat 115 with a plurality of holes 116 therethrough, and a valve member comprising a flexible membrane 101 mounted on a perforated frame 102 which is linked by means of a pin 103 supported in a guide 104 to an operating diaphragm 105.

A chamber 106 across which the operating diaphragm 105 is mounted is subjected via a port 107 to direct inlet oxygen pressure from the oxygen inlet passage 11, this pressure acting on the side of the operating diaphragm 105 which faces the flexible membrane 101. The other side of the operating diaphragm 105 is subjected to inlet oxygen pressure from the oxygen inlet passage 11 via a flow restrictor 120 and a passage 119. A passage 127 leads from the chamber 106 on this side of the operating diaphragm 105 to the pilot valve 23.

FIGURE 2 shows the main valve 113 in the closed position, when no demand for oxygen exists, with the flexible membrane 101 closing the plurality of holes 116 due to the inlet oxygen pressure acting on it through the perforated frame 102. With the pilot valve 23 in the closed position as shown, oxygen pressure in the passages 119 and 127 builds up to equal the inlet oxygen pressure, so that the operating diaphragm 105 has equal pressures on both sides and does not move.

A pressure drop is produced in the sensing chamber 28 when the aviator inhales, causing the sensing diaphragm 29 to move inwards and open the pilot valve 23, just as previously described. The inlet oxygen pressure on the side of the operating diaphragm 105 facing the flexible membrane 101 is unaltered by this, but the pressure on the other side of the diaphragm 105 falls, so that the diaphragm 105 moves to the right as shown in FIGURE 2, tending to draw the flexible membrane 101 away from the valve seat 115. The flexible membrane 101 will unseat progressively, i.e. it uncovers first the holes 116 nearest to the periphery of the valve seat 115, then with increasing oxygen flow due to increased demand the inlet oxygen pressure on the operating diaphragm 105 increases, moving the diaphragm 105 further to the right and drawing the flexible membrane 101 on its frame 102 further away from the valve seat 115 to uncover more of the holes 116. Oxygen passes from the inlet passage 11 through the holes 116 to the outlet passage 12, and then to the oxygen supply line and the aviator's mask (not shown).

When the aviator stops inhaling and begins to exhale, the pressure in the sensing chamber 28 rises, closing the pilot valve 23 as previously described and allowing oxygen pressure to build up in the passages 119 and 127. The operating diaphragm 105 is thus moved back to its former position and the flexible membrane 101 is once more fully seated on the valve seat 115, closing the holes 116 and shutting off the flow of oxygen.

This cycle of events is repeated each time the aviator inhales and exhales. The construction and operation of all the other features of the regulator shown in FIGURE 2 is exactly the same as those shown in FIGURE 1 and so need not be repeated here.

The embodiment shown in FIGURE 3 is in many respects identical with that of FIGURE 1, the same reference numerals being used to indicate identical parts, but there is no pilot valve. The main valve is generally indicated by the reference numeral 213.

The main valve 213 is arranged so as to be offset from the axis of the oxygen inlet passage 11. The valve 213 has a valve seat 215 with a plurality of holes 216 therethrough, and a valve member comprising a flexible membrane 201 mounted on a perforated frame 202 which is linked to a cranked lever 208 close to the fulcrum 209 at one end thereof by means of a pin 203 supported in a guide 204.

The cranked lever 208 has its fulcrum 209 carried upon a bracket 210 on the floor of a pressure chamber 251. The free end 221 of the lever 208 is attached to the centre of a sensing diaphragm 229 which forms part of one wall of the pressure chamber 251. On the other side of the sensing diaphragm 229 is a sensing chamber 228 having a sensing port 230 in one wall. (It is to be noted that the pressure chamber 251 and sensing chamber 228 shown in FIGURE 3 are not in the same relative positions as the pressure chamber 51 and sensing chamber 28 shown in FIGURES 1 and 2.)

FIGURE 3 shows the valve 213 in the closed position, when no demand for oxygen exists, biassed by a spring 231 and with the flexible membrane 201 closing the plurality of holes 216.

A pressure drop produced when the aviator inhales is transmitted from his mask through a sensing line (not shown) and the sensing port 230 to the sensing chamber 228, causing the sensing diaphragm 229 to move inwards into this chamber. The cranked lever 208 is thus moved clockwise about its fulcrum 209, drawing the pin 203 to the right as shown in FIGURE 3 and drawing the flexible membrane 201 away from the valve seat 215. The flexible membrane 201 will unseat progressively, i.e. it uncovers first in sequence the holes 216 nearest to the periphery of the valve seat 215, then with increasing movement of the lever 208 due to increasing demand the membrane 201 will be drawn further away from the valve seat 215 to uncover more of the holes 216. Oxygen passes from the inlet passage 11 through the holes 216 to the outlet passage 12 and then to the oxygen supply line and the aviator's mask (not shown).

When the aviator stops inhaling and begins to exhale, the pressure in the sensing chamber 228 rises, restoring the sensing diaphragm 229 and cranked lever 208 to their former positions and seating the flexible membrane 201 fully on the valve seat 215 to close the holes 216.

This cycle of events is repeated each time the aviator inhales.

The clearance between the pin 203 and the guide 204 is such that a certain leakage of oxygen takes place from the oxygen inlet passage 11 into the pressure chamber 251. This performs the same function as the leakage of oxygen from the inlet passage 11 through the flow restrictor 54 into the pressure chamber 51 (FIGURE 1), providing "safety pressure" or "pressure breathing" as required. The port 250 is an optional provision for the connection of a reference pressure line (not shown) to the back of the mask exhaust valve member as previously described.

Instead of a port 230 and separate sensing line from the sensing chamber 228 to the face mask, it is possible to provide a sensing port (not shown) leading from the sensing chamber 228 to the oxygen supply passage 12. The reduction and increase in pressure consequent upon the aviator's inhalation and exhalation are then transmitted to the sensing chamber 228 by the oxygen supply line (not shown).

If desired, and as mentioned with reference to FIGURE 1, both sensing systems can be used together, i.e. the port 230 and a separate sensing line can be used together with a sensing port leading from the sensing chamber 228 to the oxygen supply passage 12.

The construction and operation of the other features of the regulator shown in FIGURE 3 is the same as that shown in FIGURE 1 and so need not be repeated here.

A valve constructed to permit the progressive and sequential opening or uncovering of orifices in the valve seat, like the valves 13, 113 and 213 in FIGURES 1, 2 and 3 respectively, is found to possess the advantage of smooth operation with substantial freedom from flutter.

The known arrangement of a valve with an orifice or orifices of fixed area suffers from the disadvantage that the oxygen pressure has to be varied to pass gas at different flow rates for different conditions of use. Oxygen passes through the fixed area orifice or orifices at a low velocity when a low flow is required, and the low velocity stream or streams entrain less air for dilution of the oxygen than is desirable. Conversely, the high velocity stream or streams passing when a high flow is required entrain more air than is desirable.

In contrast to the known arrangement, the valve of the present invention has orifices of variable effective number, and the area available for the flow of oxygen progressively increases as increased flow is required. The proportion of air entrained by the flowing oxygen is thus rendered largely independent of variation of flow of oxygen through the main or demand valve.

It is preferred that the orifices which are uncovered first by the valve member are of a finer bore than the holes which are uncovered subsequently.

A valve member which progressively opens or uncovers a plurality of orifices in a valve seat, as herein described, has a great advantage over a conventional valve member which opens or uncovers a single orifice. The conventional valve member has to unseat over its whole area against a loading acting over its whole area in order to open at all, whereas this is not the case with the present progressively opening valve member.

This feature is of particular importance in the embodiment described in FIGURE 3, because the valve member 201 follows the movements of the sensing diaphragm 229 by means of a direct mechanical linkage, and the effort needed to open the valve 213 is much less than would be needed if the valve member 201 had to be unseated over its whole area in order to pass even a low flow.

I claim:

1. A fluid flow regulator comprising a housing having therein a first gas inlet passage, a second gas inlet passage, a combined outlet passage for both gases, a demand valve in the first gas inlet passage and operative to control the flow of the first gas between said first gas inlet passage and the outlet passage, said demand valve comprising a valve member and a valve seat, the valve seat having therein a plurality of orifices, said valve member being arranged for movement relative to the valve seat and progressively operative sequentially to cover and uncover a varying number of orifices for varying the rate of flow of the first gas through said demand valve, said second gas inlet passage opening into the combined outlet passage on the downstream side of the demand valve whereby gas from the second gas inlet passage is entrained in the stream of first gas flowing through the combined outlet passage, the sequential uncovering of the orifices being arranged to maintain through those orifices which are uncovered a substantial pressure drop whereby the degree of entrainment is rendered largely independent of variation of the rate of flow of the first gas through the demand valve.

2. A regulator as claimed in claim 1, in which said orifices are of different sizes, those orifices which are uncovered first by the progressive operation of said valve member being smaller than those orifices which are uncovered subsequently.

3. A regulator as claimed in claim 1, including a pilot valve operative to open and close said demand valve in response to pressure variations in the combined outlet passage.

4. In a regulator for supplying a breathable gas to a user, an inlet passage and an outlet passage for breathable gas, a demand valve operative to control the flow of breathable gas between said inlet and outlet passages, said demand valve comprising a valve member and a valve seat, said valve seating having a plurality of orifices therein, said valve member being arranged for movement relative to said valve seat and progressively operative sequentially to cover and uncover a varying number of orifices for varying rate of flow of breathable gas through said demand valve, an air inlet passage in communication at one end with the atmosphere and in open communication at its other end with said outlet passage, said outlet passage being constructed so that the flow of gas through those orifices which are uncovered is arranged to exert an entrainment action to dilute the flow of gas with atmospheric air, said plurality of orifices being of different sizes and those orifices which are uncovered first by the progressive operation of said valve member being smaller than those orifices which are uncovered subsequently, the sequential uncovering of the orifices being arranged to maintain through those orifices which are uncovered a substantial pressure drop whereby the degree of entrainment is rendered largely independent of variation of rate of flow of breathable gas through the demand valve.

5. In a regulator for controlling the flow of breathable gas from a source of breathable gas under pressure, the combination of a casing having an inlet passage and an outlet passage for breathable gas intersected by a valve seat, a plurality of orifices in said valve seat, a differential pressure actuated valve member movable relative to said seat and progressively operative sequentially to cover and uncover a varying number of orifices for varying rate of flow of breathable gas from said source, an air inlet passage in communication at one end with the atmosphere and in open communication at its other end with said outlet passage, said outlet passage being constructed so that the flow of breathable gas through those orifices which are uncovered is arranged to exert an entrainment action to dilute the flow of gas with atmospheric air, the sequential uncovering of the orifices being arranged to maintain through those orifices which are uncovered a substantial pressure drop whereby the degree of entrainment is rendered largely independent of a variation of rate of flow of gas through said regulator, passageway means establishing communication between said inlet passage and each side of said valve member whereby each side of said valve member is subjected to inlet pressure, pilot valve means in said casing for controlling the operation of said valve member and including a pilot valve element movable from one position to another to relieve the pressure acting on one side of said valve member for causing actuation of said valve member relative to said seat, a flexible diaphragm sensitive to a pressure condition on one side thereof for actuating said element between said positions upon a change in said condition, means communicating with said inlet passage for subjecting the other side of said diaphragm to the gas pressure in said inlet passage to actuate said element independently of a change in said pressure condition, and means carried by said casing and being operative in response to atmospheric pressure variations for varying the pressure acting on the other side of said diaphragm.

6. In a regulator for supplying a breathable gas to a user, an inlet passage and an outlet passage for breathable gas, a demand valve operative to control the flow of breathable gas between said inlet and outlet passages, said demand valve comprising a differential pressure actuated valve member and a valve seat, said valve seat having a plurality of orifices therein, said valve member being movable relative to said seat and progressively operative sequentially to cover and uncover a varying number of orifices for varying rate of flow of breathable gas through said demand valve, an air inlet passage in communication at one end with the atmosphere and in open communication at its other end with said outlet passage, said outlet passage being constructed so that the flow of gas through those orifices which are uncovered is arranged to exert an entrainment action to dilute the flow of gas with atmospheric air, said plurality of orifices being of different sizes and those orifices which are uncovered first by the progressive operation of said valve member being smaller than those orifices which are uncovered subsequently, the sequential uncovering of the orifices being arranged to maintain through those orifices which are uncovered a substantial pressure drop whereby the degree of entrainment is rendered largely independent of variation of rate of flow of breathable gas through the demand valve, a pilot valve operative to control said differential pressure actuated valve member and including a pilot valve element movable to relieve the pressure acting on one side of said valve member for causing actuation of said valve member relative to said valve seat, a flexible diaphragm sensitive to a pressure condition on one side thereof for actuating said pilot valve element upon a change in said condition, said pressure condition changing as the user inhales and exhales, means communicating with said inlet passage for subjecting the other side of said diaphragm to the gas pressure in said inlet passage to actuate said pilot valve element independently of a change in said pressure condition, and means operative in response to atmospheric pressure variations and also to a user-operated control means for varying the pressure acting on the other side of said diaphragm.

References Cited

UNITED STATES PATENTS

| | | |
|---|---|---|
| 2,616,442 | 11/1952 | Holmes. |
| 2,675,025 | 4/1954 | Wynkoop _____ 137—625.3 XR |

FOREIGN PATENTS

| | | |
|---|---|---|
| 1,267,290 | 6/1961 | France. |
| 885,353 | 12/1961 | Great Britain. |

WILLIAM F. O'DEA, Primary Examiner

RICHARD GERARD, Assistant Examiner

U.S. Cl. X.R.

128—145.8; 137—98, 604, 625.28; 251—61.1